(12) United States Patent
Hoeppner et al.

(10) Patent No.: US 11,243,982 B2
(45) Date of Patent: Feb. 8, 2022

(54) IMMUTABLE PARTITIONING FOR DATABASES

(71) Applicant: International Business Machines Corporation, Armonk, NY (US)

(72) Inventors: Trent Hoeppner, Beijing (CN); Peng Hui Jiang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 544 days.

(21) Appl. No.: 16/379,877

(22) Filed: Apr. 10, 2019

(65) Prior Publication Data

US 2020/0327146 A1 Oct. 15, 2020

(51) Int. Cl.
| | |
|---|---|
| G06F 16/30 | (2019.01) |
| G06F 16/27 | (2019.01) |
| G06F 16/22 | (2019.01) |
| G06F 16/25 | (2019.01) |
| G06F 16/958 | (2019.01) |

(52) U.S. Cl.
CPC ............ G06F 16/278 (2019.01); G06F 16/22 (2019.01); G06F 16/258 (2019.01); G06F 16/958 (2019.01)

(58) Field of Classification Search
CPC ...... G06F 16/22; G06F 16/258; G06F 16/278; G06F 16/958
See application file for complete search history.

(56) References Cited

U.S. PATENT DOCUMENTS

| | | | |
|---|---|---|---|
| 5,495,606 A | 2/1996 | Borden | |
| 5,592,661 A | 1/1997 | Eisenberg | |
| 5,600,832 A | 2/1997 | Eisenberg | |
| 5,758,337 A | 5/1998 | Hammond | |
| 6,026,371 A * | 2/2000 | Beck | G06Q 30/0277 |
| | | | 705/14.73 |
| 8,635,425 B1 * | 1/2014 | Adogla | G06F 8/63 |
| | | | 711/173 |
| 8,639,770 B1 * | 1/2014 | Raley | G06F 16/9574 |
| | | | 709/216 |
| 8,893,131 B2 | 11/2014 | Ramakrishnan | |
| 9,052,831 B1 | 6/2015 | Stefani | |
| 2008/0228802 A1 * | 9/2008 | Marshall | G06F 16/2282 |
| 2010/0114831 A1 | 5/2010 | Gilbert | |

(Continued)

OTHER PUBLICATIONS

Article entitled "IBM Sterling Control Center 6.1: Database Partitioning", by IBM, dated 2016 (Year: 2016).*

*Primary Examiner* — Mahesh H Dwivedi
(74) *Attorney, Agent, or Firm* — Aaron N. Pontikos

(57) ABSTRACT

A computer-implemented method for propagating changes to a live website includes logically moving a second immutable delta partition located in a staging database of a staging environment to a production environment. The second immutable delta partition is a replica of a first immutable delta partition located in the staging database of the staging environment. The computer-implemented method further includes logically moving a second delta index located in the staging database to the production environment based on altering the second delta index for the staging database to reference: (i) unique network addresses corresponding to data partitions located in a production database of the production environment and (ii) a unique network address of the second immutable delta partition located in the staging database.

20 Claims, 8 Drawing Sheets

(56) References Cited

U.S. PATENT DOCUMENTS

| | | | |
|---|---|---|---|
| 2015/0126110 A1* | 5/2015 | Ashley | H04W 4/80 |
| | | | 455/41.1 |
| 2015/0186490 A1 | 7/2015 | Denuit | |
| 2015/0293980 A1* | 10/2015 | Dola | G06F 16/137 |
| | | | 726/26 |
| 2016/0063048 A1 | 3/2016 | Yancey | |
| 2018/0203912 A1* | 7/2018 | Cao | G06F 16/2471 |
| 2020/0142882 A1* | 5/2020 | Cseri | G06F 16/2455 |

\* cited by examiner

IMMUTABLE PARTITIONING FOR DATABASES

BACKGROUND

The present invention relates generally to the field of relational database management systems, and more particularly to software deployment.

A relational database management system (RDBMS) is a type of database management system (DBMS) used to perform create, update, read and delete functions on a relational database. With a relational database, data is organized in tables containing rows and columns. Each table (i.e., "relation") includes one or more columns comprised of data categories or "attributes." Each row (i.e., record or tuple) includes a unique instance of data for those categories defined by the columns. Each table further has a unique primary key, which identifies the information included in the table. The relationship between tables is tracked by a foreign key, which is a field in a table that links to the primary key of another table.

Software deployment is the process of integrating software from a staging environment to a production environment. A staging environment is an environment for making changes and testing said changes to software or websites that resembles or mirrors an actual application of said software or website running in a production environment. The primary use of a staging environment is to test installation, configuration, migration scripts and procedures before they are applied to the production environment to ensure the smooth transition of changes made to the production environment. The production environment, also known as a "live" environment, is the environment where the software is actually put into operation for its intended use by end users.

SUMMARY

According to one embodiment of the present invention, a computer-implemented method for propagating changes to a live website is disclosed. The computer-implemented method includes logically moving a second immutable delta partition located in a staging database of a staging environment to a production environment. The second immutable delta partition is a replica of a first immutable delta partition located in the staging database of the staging environment. The computer-implemented method further includes logically moving a second delta index located in the staging database of the staging environment to the production environment based on altering the second delta index for the staging database to reference: (i) unique network addresses corresponding to data partitions located in a production database of the production environment and (ii) a unique network address of the second immutable delta partition located in the staging database.

According to another embodiment of the present invention, a computer program product for propagating changes to a live website is disclosed. The computer program product includes one or more computer readable storage media and program instructions stored on the one or more computer readable storage media. The program instructions include instructions to logically move a second immutable delta partition located in a staging database of a staging environment to a production environment. The second immutable delta partition is a replica of a first immutable delta partition located in the staging database of the staging environment. The program instructions further include instructions to logically move a second delta index located in the staging database to the production environment based on altering the second delta index for the staging database to reference: (i) unique network addresses corresponding to data partitions located in a production database of the production environment and (ii) a unique network address of the second immutable delta partition located in the staging database.

According to another embodiment of the present invention, a computer system for propagating changes to a live website is disclosed. The computer system includes one or more computer system includes one or more computer processors, one or more computer readable storage media, and program instructions stored on the computer readable storage media for execution by at least one of the one or more processors. The program instructions include instructions to logically move a second immutable delta partition located in a staging database of a staging environment to a production environment. The second immutable delta partition is a replica of a first immutable delta partition located in the staging database of the staging environment. The program instructions further include instructions to logically move a second delta index located in the staging database to the production environment based on altering the second delta index for the staging database to reference: (i) unique network addresses corresponding to data partitions located in a production database of the production environment and (ii) a unique network address of the second immutable delta partition located in the staging database.

DETAILED DESCRIPTION

Figure 1:
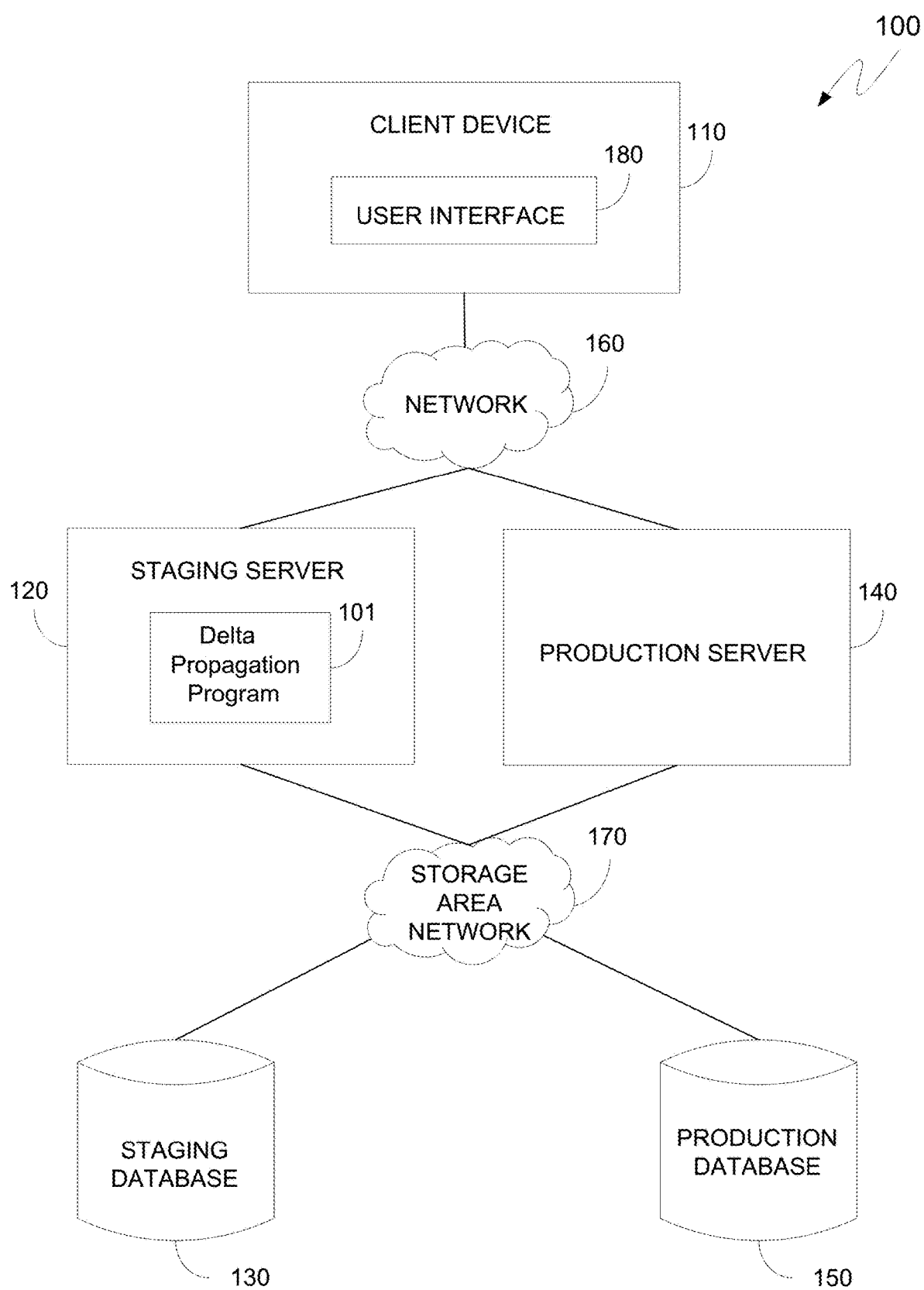
FIG. 1 is a functional block diagram illustrating a network computing environment, generally designated 100, suitable for operation of a delta propagation program 101 in accordance with at least one embodiment of the invention.

In some applications, such as ecommerce websites, there are two instances of a website that are asynchronously replicated between a staging environment and a production environment. In the staging environment, the first instance runs on a staging server and is formed from data stored on a staging database. In the production environment, the second instance runs on a production server and is formed from data stored on a production database. Whereas the staging database is used to make and test changes to a website running on the staging server, the changes are eventually propagated to a website running on the production server by physically copying changes from the staging database to the production database.

A current approach for copying data from a staging database to a production database includes using triggers to capture changes to data (i.e., "change data") as each SQL statement that performs a data manipulation language (DML) operation (INSERT, UPDATE OR DELETE) is made and recording the changes in a separate table (e.g., change table). When it is time to physically copy the change data from the staging database to the production database, only the recorded inserts, updates, and deletes need to be copied. This approach may be adequate for copying frequent, relatively small changes from the staging database to the production database when the production database is not at peak load and can be taken offline. However, this approach may not always be adequate for copying large amounts of changes from the staging database to the production database when the production database is at peak load and cannot be taken offline.

Embodiments of the present invention recognize several deficiencies with the above-mentioned approach for physically copying data between a staging database and a production database. Under this approach, copying changes or differences (i.e., deltas) in data from a staging database to a production database of a "live" website (as opposed to a website that is taken offline) slows down the copying process, especially when the load of the production database is high. This can ultimately result in failures due to deadlock and timeouts for both the copying process and the performance of the website, such as inconsistencies in the data presented to a user. Although failures may be minimal for frequent, relatively small changes made to a "live" website, the likelihood of failures increases as the amount of data physically copied from a staging database to a production database of a "live" website increases. Thus, under this current approach, it is often necessary to take the website offline when relatively large updates need to be made.

Embodiments of the present invention recognize that it would be advantageous to be able to perform large updates to a website while a website is "live." If large updates to a website need to be performed (e.g., due to seasonal changes to inventory (new stock coming in) or prices (to get rid of the old stock)), it is crucial that the website remain "live" as shoppers will be especially eager to place orders when new stock arrives or old stock goes on sale.

For example, a customer can copy 1,000,000 records from a staging database to a production database in less than 10 minutes when a website is taken offline. However, as the size of the customer increases or the customer handles multiple websites running from the same database, the number of records that may be required to be copied can grow upwards of 5,000,000,000 records. In this scenario, the amount of time required to copy data from the staging database to the production database, and thus the amount of time a website needs to be taken offline, can be in the order of hours or even days. Taking a website offline for such an extended period of time can result in a loss of revenue, especially during holiday sales, such as Black Friday or Cyber Monday, when the sale only lasts for one day. Even if a website remains live during copying of a large amount of data, the number of failures due to deadlock and timeouts for both the copying process and the performance of the website will also result in a loss of revenue.

Embodiments of the present invention provide one or more of: features, characteristics, operations and/or advantages to the above-mentioned deficiencies and generally encompass (i) an improvement to at least the fields of relational database management systems and software deployment and (ii) a technical solution to one or more challenges in the fields of relational database management systems and software deployment. According to embodiments of the present invention, data is instantly (i.e., less than one second) transferred from a staging environment to a production environment without the need for physically copying data between a staging database and a production database. Accordingly, embodiments of the present invention eliminate failures due to deadlock and timeouts caused by prior copying processes to a live website while maintaining optimal performance of the website. Moreover, according to embodiments of the present invention, data is instantly transferred with a low risk of failure, regardless of the data size, without taking a website offline. Additionally, since propagation of data is accomplished without physically copying data between databases, existing and new user transactions with a live website can continue to be carried out safely without risk of data inconsistencies or errors.

Embodiments of the present invention provide one or more of: features, characteristics, operations and/or advantages: (i) is it fast and safe to ramp up and ramp down performance of a production server by creating and/or destroying copies of immutable data partitions; (ii) there is no need for transaction logs or other overhead for immutable partitions since no changes are allowed to these partitions; (iii) an immutable data partition cache never needs to be invalidated since the database data will not change; (iv) the size of mutable partitions can be kept small by performing a split operation whenever a table reaches a certain size, thereby making inserts and updates to a live website faster; (v) an ability to safely make copies of immutable partitions (since the data in these partitions cannot be changed) while a website is live, thereby eliminating any downtime when scaling up is needed; (vi) instant propagation (i.e., less than one second) of data to a live website; and (vii) an elimination of multiple transactions, data integrity checking, large transaction logs and rollback issues during the propagation process.

In embodiments of the invention, in a staging environment, data is written to a mutable partition of a staging database. At any time, a new partition can be created and is assigned a unique network address. The new partition becomes the new mutable partition and all write operations are directed to this partition. The old partition becomes an immutable partition and retains its own unique network address. In some embodiments, once a partition becomes immutable, copies are made for redundancy and performance. For example, copies of an entire partition are made via binary copy (rather than database copy) since it is faster (copies can be done at the file or virtual machine level instead of at the row level) and safer (changes are not allowed to be made). When a partition becomes immutable and a copy has been made, a production database server is instantly configured to logically add the copied immutable partition, such that new queries will include the newly added immutable partition in its search.

In other embodiments, a mutable partition of a staging database includes several nodes or copies maintained in an active-active database topology. When a new partition is created, each of the nodes in the topology becomes an immutable copy and one of the copies is selected for instant configuration by the production database server to add the copy for use in new queries. In any of these embodiments, creation of a new mutable partition results in an instant activation of any number of rows of an immutable partition from the staging environment to the production environment of a live website.

In embodiments of the invention, immutable partitions of a staging database and production database are accumulated overtime. In some embodiments, database queries are redirected to every immutable partition and mutable partition. This stems from the fact that when data stored in an immutable partition needs to be altered, changes, deletes and updates to the data must be recorded in a mutable partition. Accordingly, it is necessary that database queries access all partitions to retrieve the most current version of data stored in a staging environment. In an embodiment, database queries that are redirected to every immutable partition and mutable partition are accessed in parallel, the result from each partition is consolidated and a final query result is generated. In some embodiments, in order to optimize performance of database queries, the index for each partition is introduced to cache previous search results.

In some embodiments, a consolidation operation can be performed on any number of immutable partitions stored in the production and/or staging environment in the background at any given point in time. In these embodiments, an empty mutable target data partition is created and rows from selected input immutable partitions are copied to the target data partition, thereby consolidating database operations into a single partition. For example, if a row is inserted in a first immutable partition, updated in a second immutable partition and finally deleted in a third immutable partition, the row is not written to the target data partition. In these embodiments, the upon completion of the consolidation operation (e.g., there is no further data to be consolidated or the target data partition is full) the target data partition is converted from a mutable partition to an immutable partition and replaces all of the input immutable partitions selected for consolidation. It should be appreciated that this consolidation process optimizes the performance of database queries since the number of partitions that need to be accessed to generate a query result is reduced. In some embodiments, the consolidation operation can be performed using multiple mutable target data partitions and sharding the data to further optimize performance of database queries by deriving a target shard(s) from the query itself.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram illustrating a network computing environment, generally designated 100, suitable for operation of a delta propagation program 101 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes client device 110, staging server 120, staging database 130, production server 140 and production database 150 interconnected over network 160 and storage area network (SAN) 170. In embodiments of the invention, network 160 can be a telecommunications network, a local area network (LAN), a wide area network (WAN), such as the Internet, or a combination of the three, and can include wired, wireless, or fiber optic connections. In embodiments of the invention, SAN 170 provides block-level network access to storage, such as staging database 130 and production database 150. Network 160 and SAN 170 can include one or more wired and/or wireless networks that are capable of receiving and transmitting data, voice, and/or video signals, including multimedia signals that include voice, data, and video information. In general, network 160 and SAN 170 can be any combination of connections and protocols that will support communications between client device 110, staging server 120, staging database, 130, production server 140, production database 150 and other computing devices (not shown) within network computing environment 100.

In various embodiments of the invention, client device 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. In general, client device 110 represents any programmable electronic devices or combination of programmable electronic devices capable of executing machine readable program instructions and communicating with staging server 120 staging database 130, production server 140, production database 150 and other computing devices (not shown) within network computing environment 100 via a network, such as network 160 and SAN 170.

In some embodiments, client device 110 allows a user to access an application running on staging server 120 and/or production server 140 via a network, such as network 160. In some embodiments, client device 110 allows a user to communicate with delta propagation program 101 via a network, such as network 160. In some embodiments, client device 110 allows a user to access data stored on a database, such as staging database 130 and production database 150 via a network, such as network 160 and SAN 170.

Client device 110 includes user interface 180. User interface 180 provides an interface between client device 110, staging server 120, production server 140 and delta propagation program 101. In some embodiments, user interface 180 can be a graphical user interface (GUI) or a web user interface (WUI) and can display text, documents, web browser windows, user options, application interfaces and instructions for operation, and includes the information (such as graphic, text, and sound) that a program presents to a user and the control sequences the user employs to control the program. In other embodiments, user interface 180 can be mobile application software that provides an interface between client device 110, staging server 120, staging database, 130, production server 140, production database 150 and delta propagation program 101.

In various embodiments of the invention, each of staging server 120 and production server 140 are computing devices that can be a standalone device, a management server, a web server, an application server, a mobile device, or any other electronic device or computing system capable of receiving, sending, and processing data. In other embodiments, staging server 120 and production server 140 represent a server computing system utilizing multiple computers as a server system, such as in a cloud computing environment. In an embodiment, staging server 120 and production server 140 represent a computing system utilizing clustered computers and components (e.g. database server computers, application server computers, web server computers, media server computers, etc.) that act as a single pool of seamless resources when accessed within network computing environment 100. In general, staging server 120 and production server 140 represent any programmable electronic device or combination of programmable electronic devices capable of executing machine readable program instructions and communicating with each as other, as well as with client device 110, staging database 130, production database 150 and delta propagation program 101 within network computing environment 100 via a network, such as network 160 and SAN 170.

In various embodiments of the invention, two instances of a common website are asynchronously replicated between staging server 120 and production server 140. The first instance of a web site running on production server 140 is formed from data stored on production database 150 and is a "live" website. The second instance of the website running on staging server 120 is formed from data located in staging database 130 and is "offline."

Staging server 120 includes delta propagation program 101. Although delta propagation program 101 is depicted in FIG. 1 as being integrated with staging server 120, in alternative embodiments, delta propagation program 101 is remotely located from staging server 120. For example, delta propagation program 101 can be integrated with production server 140. In another example, delta propagation program 101 can be integrated with both staging server and production server 140. Staging server 120 and production server 140 may include internal and external hardware components, as depicted and described in further detail with respect to FIG. 8.

In various embodiments of the invention, staging database 130 and production database 150 store data that is accessed by staging server 120 and production server 140 for running an application, such as a website. In some embodiments, staging database 130 and production database 150 are non-relational databases (i.e., NoSQL databases). In other embodiments, staging database 130 and production database 150 are relational databases (i.e., SQL databases).

In embodiments of the invention, two instances of a website are asynchronously replicated between a staging environment and a production environment. In the staging environment, a first instance of an application running on staging server 120 is formed from data stored on staging database 130. In the production environment, a second instance of the same application running on production server 140 is formed from data stored on production database 150. In some embodiments, consistency is maintained between one or more copies of a read-only database (e.g., a production database) and a read-write database (e.g., a staging database), where the copies of the read-only databases need not be synchronized with the copies of the read-write databases.

In embodiments of the invention, staging database 130 receives input/output requests from client device 110, staging server 120 and/or production server 140. In some embodiments, staging database 130 performs create, read, update and delete operations to data stored on staging database 130. In some embodiments, production database 150 performs only read operations. In these embodiments, data stored on production database 150 is designated as "read only" to ensure that the data integrity of a live application or website is maintained.

In embodiments of the invention, staging database includes one or more replicas of data partitions stored on staging database 130. In some embodiments, the one or more replicas of data partitions are synchronized. In these embodiments, data written to a first mutable delta partition in staging database 130 is maintained in an active-active configuration with a second mutable delta partition in staging database 130. In other embodiments, the one or more replicas of data partitions are not synchronized. In these embodiments, a replica of data written to a mutable data partition in staging database 130 is generated for instant propagation to a production environment.

In some embodiments, staging database 130 and production database 150 are relational databases that include a plurality of network addressable base partitions and network addressable delta partitions. In other embodiments, base partitions, delta partitions and delta indexes for a respective environment are not limited to being stored in a single staging database or a single production environment. Rather, each base partition, delta partition and delta index are implemented as a separate network addressable relational database where data is stored. In these embodiments, staging server 120 and production server 140 include a master delta index that includes: (i) column values (i.e., keys) across a delta index and (ii) pointers holding the unique network address of a delta index where a particular column value can be found. Each delta index in turn includes: (i) column values (i.e., key) across a data partition and (ii) pointers holding the unique network address of a delta index where a particular column value can be found.

In any of these embodiments, each base partition and each delta partition is formed by one or more tables. In embodiments of the invention, changes made to data originally stored in a base partition are recorded in a delta partition. Similarly, changes made to data stored in a previous delta partition are recorded in a subsequent delta partition. Each base partition and each delta partition is formed by one or more tables. Each table (i.e., "relation") includes one or more columns comprised of data categories or "attributes." Each row (i.e., record or tuple) of a table includes a unique instance of data for those categories defined by the columns. In some embodiments, a delta partition includes a column for tracking whether changes made to data included in the delta index have been inserted, updated, and/or deleted. One of ordinary skill in the art will appreciate that a base partition or delta partition of the present invention can include any number of tables, any number of columns, any number of rows and any combination thereof.

In some embodiments, a delta partition includes a column for tracking whether changes made to data included in the delta index have been inserted, updated, and/or deleted. One of ordinary skill in the art will appreciate that a base partition or delta partition of the present invention can include any number of tables, any number of columns, any number of rows and any combination thereof.

In embodiments of the invention, each base partition and each delta partition created in staging database 130 and production database 150 is assigned a unique address (e.g., IP address). For example, staging database 130 includes base partition "A" and base partition "B", which is a copy of base partition "A", and production database 150 includes base partition "C." In this example, base partition "A" is assigned the IP address "192.168.1.0", base partition "B" is assigned the IP address "192.168.1.2" and base partition "C" is assigned the IP address "192.168.1.3".

In embodiments of the invention, a new delta partition is created in response to receiving a split operation. In an embodiment, a split operation occurs when the changes made to data recorded in a previous delta partition are to be propagated from a staging environment to a production environment. In an embodiment, a split operation occurs based on a number of changes to data recorded in a previous delta partition exceeding a predetermined threshold. In an embodiment, a split operation occurs based on an amount of data stored in a previous delta partition exceeding a predetermined threshold. In any of these embodiments, when a split operation occurs, the previous data partition from which the split occurs maintains its unique address and the newly formed data partition is assigned a new unique address.

In embodiments of the invention, when a new delta partition is created in response to a split operation, the new delta partition is designated as a mutable partition and the previous delta partition from which the split was created from is redesignated (i.e., converted) from mutable to immutable. One of ordinary skill in the art will appreciate that a mutable partition is a data partition whose state can be modified. In other words, once a data partition is designated as mutable, update, insert and delete operations, as well as read operations, can be performed on the data partition. One of ordinary skill in the art will appreciate that an immutable partition is a data partition whose state cannot be modified. In other words, once a data partition is designated as immutable, update, insert, and delete operations cannot be performed on the data partition. Accordingly, only read operations can be performed on an immutable data partition. When changes, updates or deletes to data included in an immutable partition are required, the changes can only be recorded in the most recently created mutable delta partition.

In embodiments of the invention, one or more delta indexes are created for each of staging database 130 and production database 150. Each delta index includes a unique network address. In these embodiments, a delta index includes (i) column values (i.e., keys) across data partitions and (ii) pointers holding the unique network address of a data partition where a particular column value can be found. For example, if Delta Partition "X" has a unique network address "1234" and includes column value "A," then the delta index will include column value "A" and a pointer to network address "1234" indicating that column value "A" is located in Delta Partition "X" having the unique network address "1234."

Figure 2:
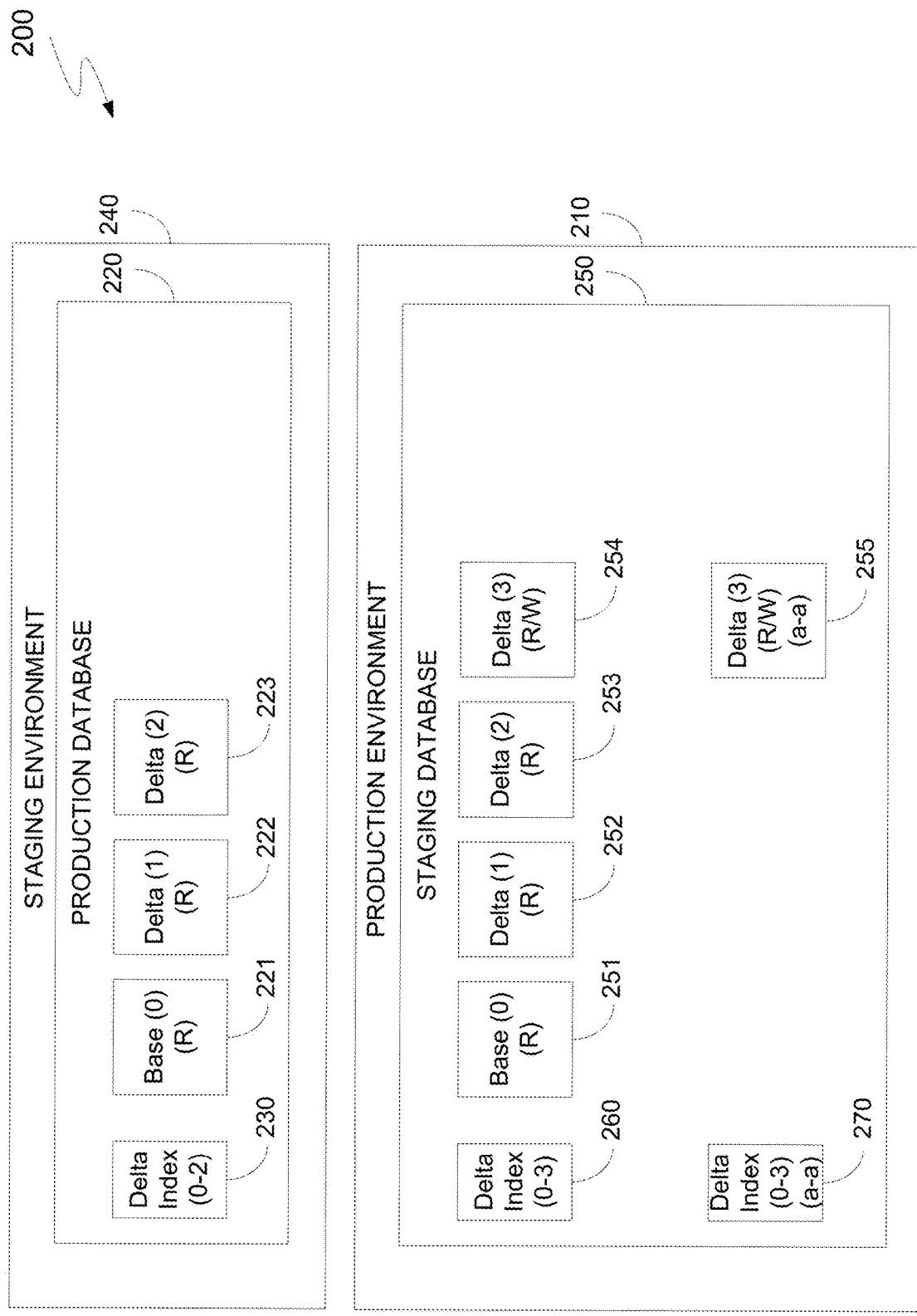
FIG. 2 is a block diagram illustrating an exemplary staging environment 240 and production environment 210 at a first initial state prior to propagating data from staging environment 240 to production environment 210 in accordance with at least one embodiment of the invention.

FIG. 2 is an exemplary staging environment and production environment at a first initial state prior to propagating data from a staging environment to a production environment in accordance with at least one embodiment of the invention. As depicted in FIG. 2, production environment 210 includes production database 220. Production database 220 includes Base (0) Partition 221, Delta (1) Partition 222, Delta (2) Partition 223 and Delta Index 230. Base (0) Partition 221, Delta (1) Partition 222 and Delta (2) Partition 223 are copies of Base (0) Partition 251, Delta (1) Partition 252 and Delta (2) Partition 253 of staging database 250 and are designated as immutable. Accordingly, only read (R) operations can be performed on these data partitions. Delta Index 230 is also designated as immutable and includes: (i) the column values across Base (0) Partition 221, Delta (1) Partition 222 and Delta (2) Partition 223 and (ii) a set of pointers holding the unique network address of a data partition included in production database 220 where a particular column value can be found. In this exemplary environment of FIG. 2, it should be understood that a production server (not depicted) of production environment 210 is running a first instance of a "live" website. Accordingly, the live website is formed by data included in those delta partitions physically located in production database 220.

As further depicted in FIG. 2, staging environment 240 includes staging database 250. Staging database 250 includes Base (0) Partition 251, Delta (1) Partition 252, Delta (2) Partition 253, Delta (3) Partition 254, Delta (3) Partition 255, Delta Index 260 and Delta Index 270. Base (0) Partition 251, Delta (1) Partition 252 and Delta (2) Partition 253 are designated as immutable. Accordingly, only read (R) operations can be performed on these data partitions. Delta (3) Partition 254 and Delta (3) Partition 2255 are designated as mutable. Accordingly, read (R) and write (W) operations can be performed on these data partitions. Delta (3) Partition 254 and Delta (3) Partition 255 are copies (i.e., replicas) of each other and are maintained in an active-active configuration. Accordingly, as changes, updates and deletes to data are written to Delta (3) Partition 254, the same changes, updates and deletes to the data are also written to Delta (3) Partition 255. In this exemplary environment of FIG. 2, it should be understood that a staging server (not depicted) of staging environment 230 is running a second instance of the website which is offline. Accordingly, the second instance of the website is formed by data included in those data partitions located in staging database 250.

Delta Index 260 and Delta Index 270 each include: (i) the column values across Base (0) Partition 251, Delta (1) Partition 252, Delta (2) Partition 253, Delta (3) Partition 254 and Delta (3) Partition 255 and (ii) a set of pointers holding the unique network address of a data partition included in staging database 250 where a particular column value can be found. In this exemplary embodiment, Delta Index 260 and Delta Index 270 are designated as mutable. Accordingly, read (R) and write (W) operations can be performed on these indexes. Furthermore, Delta Index 260 and Delta Index 270 are copies (i.e., replicas) of each other and are maintained in an active-active configuration. Accordingly, as data is written to Delta (3) Partition 254 and Delta (3) Partition 255, Delta Index 260 and Delta Index 270 are simultaneously updated.

It should be appreciated that in this exemplary environment of FIG. 2, a production server (not depicted) accesses Delta Index 230 in response to receiving queries for performing read (R) and write (W) operations on production database 220. It should further be appreciated that in this exemplary environment of FIG. 2, a staging server (not depicted) accesses Delta Index 260 and Delta Index 270 in response to receiving queries for performing read (R) and write (W) operations on staging database 250.

Figure 3:
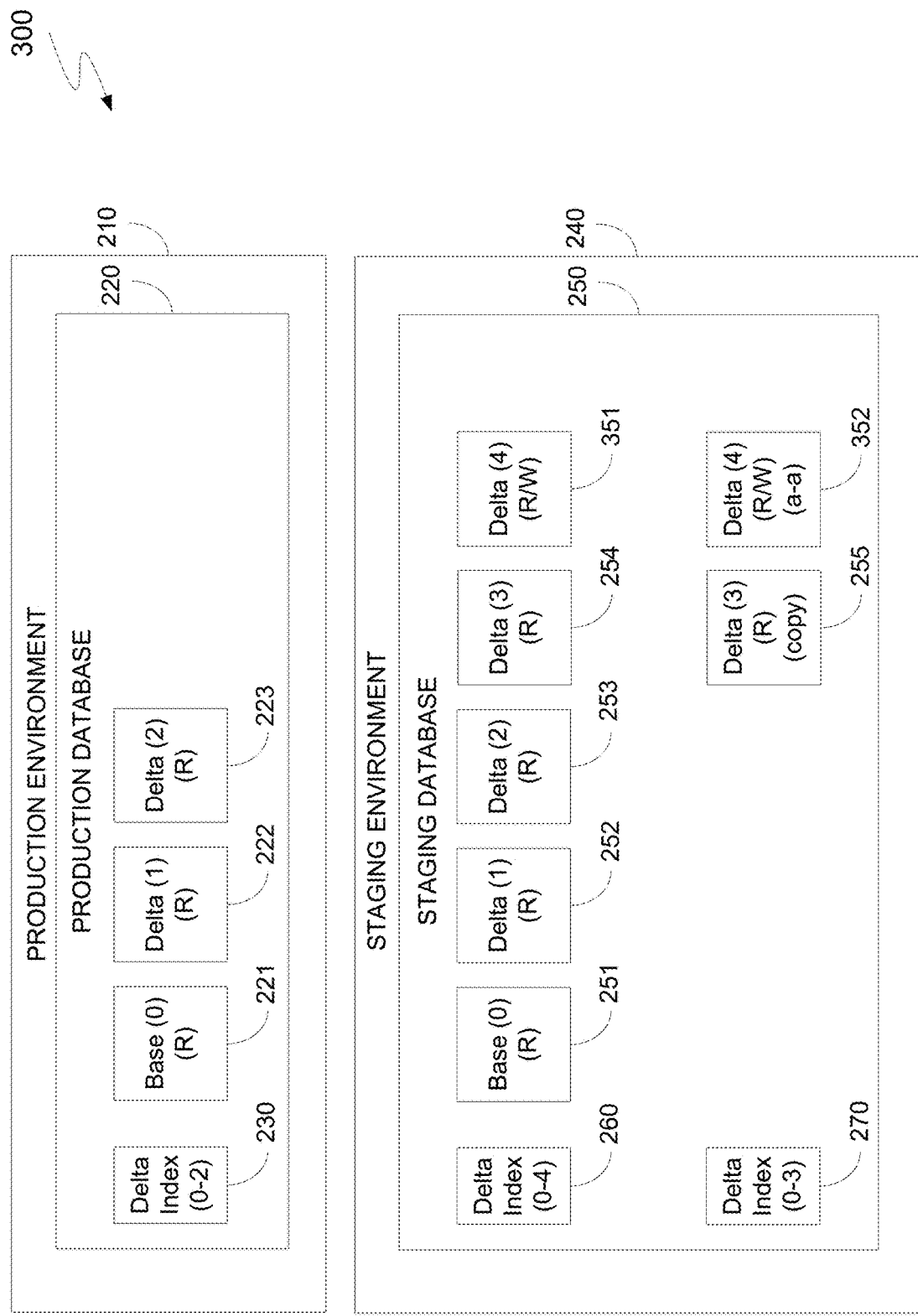
FIG. 3 is a block diagram illustrating staging environment 240 and production environment 210 after creating a new delta partition in preparation for propagating data from staging environment 240 to production environment 210 in accordance with at least one embodiment of the invention.

FIG. 3 is a block diagram illustrating staging environment 240 and production environment 210 after creating a new delta partition in preparation for propagating data from staging environment 240 to production environment 210 in accordance with at least one embodiment of the invention. In embodiments of the invention, it should be appreciated that newly created delta partitions are designated as mutable and maintained in an active-active configuration. In embodiments of the invention, it should further be appreciated that creation of new delta partitions results in: (i) the re-designation (i.e., conversion) of preceding delta partitions from mutable to immutable and (ii) the removal of preceding delta partitions from an active-active configuration.

As depicted in FIG. 3, production environment 210 includes production database 220. Production database 220 of FIG. 3 includes Base (0) Partition 221, Delta (1) Partition 222, Delta (2) Partition 223 and Delta Index 230 which are identical to FIG. 2. Base Partition 221, Delta (1) Partition 222 and Delta (2) Partition 223 remain designated as immutable. Accordingly, only read (R) operations can be performed on these data partitions. Delta Index 230 also remains designated as immutable. Accordingly, only read (R) operations can be performed on Delta Index 230. Delta Index 230 of FIG. 3 includes: (i) the column values across Base Partition 321, Delta (1) Partition 322 and Delta (2) Partition 323 and (ii) a set of pointers holding the unique network address of a data partition included in production database 220 where a particular column value can be found.

As further depicted in FIG. 3, staging environment 240 includes staging database 250. Staging database 250 includes Base (0) Partition 251, Delta (1) Partition 252, Delta (2) Partition 253, Delta (3) Partition 254, Delta (3) Partition 255, Delta (4) Partition 351, Delta (4) Partition 352, Delta Index 260 and Delta Index 270. Base Partition 251, Delta (1) Partition 252, Delta (2) Partition 253, Delta (3) Partition 254 and Delta (3) Partition 255 are identical to FIG. 2.

In this exemplary embodiment, Delta (3) Partition 254 (previously designated as mutable in accordance with FIG. 2) and Delta (3) Partition 255 (previously designated as mutable in accordance with FIG. 2) are now designated as immutable and are no longer maintained in an active-active configuration. Base Partition (0) 251, Delta (1) Partition 252 and Delta (2) Partition 253 remain designated as immutable. Accordingly, only read (R) operations can be performed on these data partitions.

In this exemplary embodiment, newly created Delta (4) Partition 351 and newly created Delta (4) Partition 352 are designated as mutable. Accordingly, read (R) and write (W) operations can be performed on these data partitions. Newly created Delta (4) Partition 351 and newly created Delta (4) Partition 352 are copies (i.e., replicas) of each other and are maintained in an active-active configuration. Accordingly, as data is written to Delta (4) Partition 351, the same data is also written to Delta (4) Partition 352.

Delta Index 260 as depicted in FIG. 3 is the same index as depicted in FIG. 2. However, Delta Index 260 now also includes: (i) the column values across newly created Delta (4) Partition 351 and newly created Delta (4) Partition 352, and (ii) a set of pointers holding the unique network addresses of Delta (4) Partition 351 and Delta (4) Partition 352 where a particular column value can be found. In this exemplary embodiment, Delta Index 260 remains designated as mutable. Accordingly, read (R) and write (W) operations can be performed on Delta Index 260. Accordingly, as data is written to Delta (4) Partition 351 and Delta (4) Partition 352, Delta Index 260 is updated.

Delta Index 270 as depicted in FIG. 3 is the same index as depicted in FIG. 2. However, Delta Index 270 (previously designated as mutable in accordance with FIG. 2) is now designated as immutable. Accordingly, only read (R) operations can now be performed on Delta Index 270. Furthermore, Delta Index 270 as depicted in FIG. 3 is no longer maintained in an active-active configuration with Delta Index 260. Accordingly, as data is written to Delta (4) Partition 351 and Delta (4) Partition 352, only Delta Index 260 (and not Delta Index 270) is updated. In other words, Delta Index 270 does not include the column values and set of pointers holding the unique network addresses of Delta (4) Partition 351 and Delta (4) Partition 352 where a particular column value corresponding to these data partitions can be found.

Figure 4:
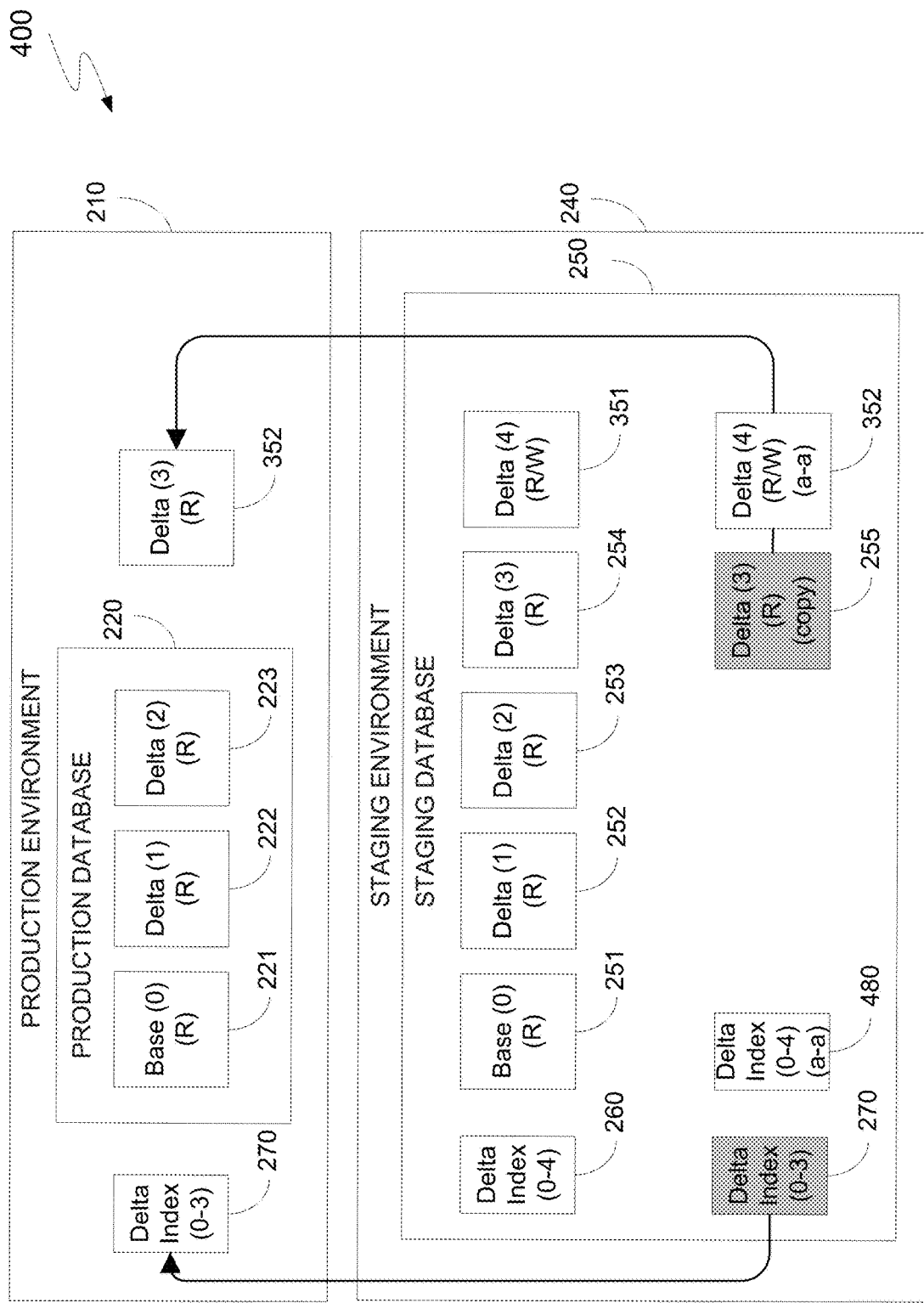
FIG. 4 is a block diagram illustrating staging environment 240 and production environment 210 after propagating data from staging environment 240 to production environment 210 in accordance with at least one embodiment of the invention.

FIG. 4 is a block diagram illustrating staging environment 240 and production environment 210 after propagating data from staging environment 240 to production environment 210 in accordance with at least one embodiment of the invention. In embodiments of the invention, it should be appreciated that changes to data stored in a staging environment are instantly propagated within a "live" application or website of a production environment.

As depicted in FIG. 4, production environment 210 includes production database 220. Production database 220 includes Base (0) Partition 221, Delta (1) Partition 222, Delta (2) Partition 223, Delta (3) Partition 255 and Delta Index 270. Base (0) Partition 221, Delta (1) Partition 222 and Delta (2) Partition 223 are identical to FIG. 3 and remain designated as immutable. Accordingly, only read (R) operations can be performed on these data partitions. As further depicted in FIG. 4, Delta (3) Partition 255 has logically been moved from staging database 250 (as indicated by the gray coloring of Delta (3) Partition 255) to production environment 210 and remains designated as immutable. Accordingly, only read (R) operations can be performed on this data partition.

As further depicted in FIG. 4, Delta Index 270 has logically been moved from staging database 250 (as indicated by the gray coloring of Delta Index 270) to production environment 210 and has replaced Delta Index 230 (previously depicted in FIG. 3). Accordingly, a production server (not depicted) of production environment 210 now references Delta Index 270 when locating and accessing data in response to query requests. It should be appreciated that in the exemplary environment of FIG. 4, logically moving Delta Index 270 from staging database 250 to production environment 210 includes altering the set of pointers of Delta Index 270 from referencing the unique network addresses of Base (0) Partition 251, Delta (1) Partition 252, Delta (2) Partition 253, Delta (3) Partition 254 of staging database to now reference the unique network addresses of Base (0) Partition 221, Delta (1) Partition 222, Delta (2) Partition 223 of production database 220. It should further be appreciated that in this exemplary embodiment, Delta Partition 270 already includes pointers that reference the unique network address of Delta (3) Partition 255.

In embodiments of the invention, during the replacement of Delta Index 230 of production environment 210 with Delta Index 270 of staging environment 240, the production server (not depicted) continues to access Delta Index 230 for database queries issued prior to the replacement. However, the production server (not depicted) will access Delta Index 270 of staging environment 240 for database queries issued after the replacement. Accordingly, once any database queries issued prior to the replacement have been processed, Delta Index 230 can be removed from production database 220 of production environment 210.

As further depicted in FIG. 4, staging environment 240 includes staging database 250. Staging database 250 includes Base (0) Partition 251, Delta (1) Partition 252, Delta (2) Partition 253, Delta (3) Partition 254, Delta (4) Partition 255, Delta (4) Partition 351, Delta (4) Partition 352 which are identical to FIG. 3. In this exemplary embodiment, Base Partition (0) 251, Delta (1) Partition 252, Delta (2) Partition 253, Delta (3) Partition 254 and Delta (3) Partition 255 remain designated as immutable. Accordingly, only read (R) operations can be performed on these data partitions. Delta (4) Partition 351 and Delta (4) Partition 352 remain in an active-active configuration. Accordingly, as data is written to Delta (4) Partition 351, the same data is also written to Delta (4) Partition 352.

Delta Index 260 is identical to FIG. 3 and remains designated as mutable. Accordingly, read (R) and write (W) operations can be performed on Delta Index 260. Delta Index 260 (previously removed from an active-active configuration with Delta Index 270 in accordance with FIG. 3) is now maintained in an active-active configuration with newly created Delta Index 480 of staging database 250. Accordingly, as data is written to Delta (4) Partition 351 and Delta (4) Partition 352, Delta Index 260 and Delta Index 480 are simultaneously updated.

Delta Index 270, although physically located in staging database 250, is now logically located in production environment 210 such that a production server (not depicted) of production environment 210 references Delta Index 270 when processing database queries for a live website running on the production server (not depicted).

Delta Index 480 is newly created and is a copy (i.e., replica) of Delta Index 260 of staging database 250. In this exemplary embodiment, newly created Delta index 480 is designated as mutable. Accordingly, read (R) and write (W) operations can be performed on Delta Index 480. Newly created Delta Index 480 includes: (i) the column values across Base (0) Partition 251, Delta (1) Partition 252, Delta (2) Partition 253, Delta (3) Partition 254, Delta (3) Partition 255, Delta (4) Partition 351 and Delta (4) Partition 352 and (ii) a set of pointers holding the unique network addresses of these data partitions where a particular column value can be found.

Figure 5:
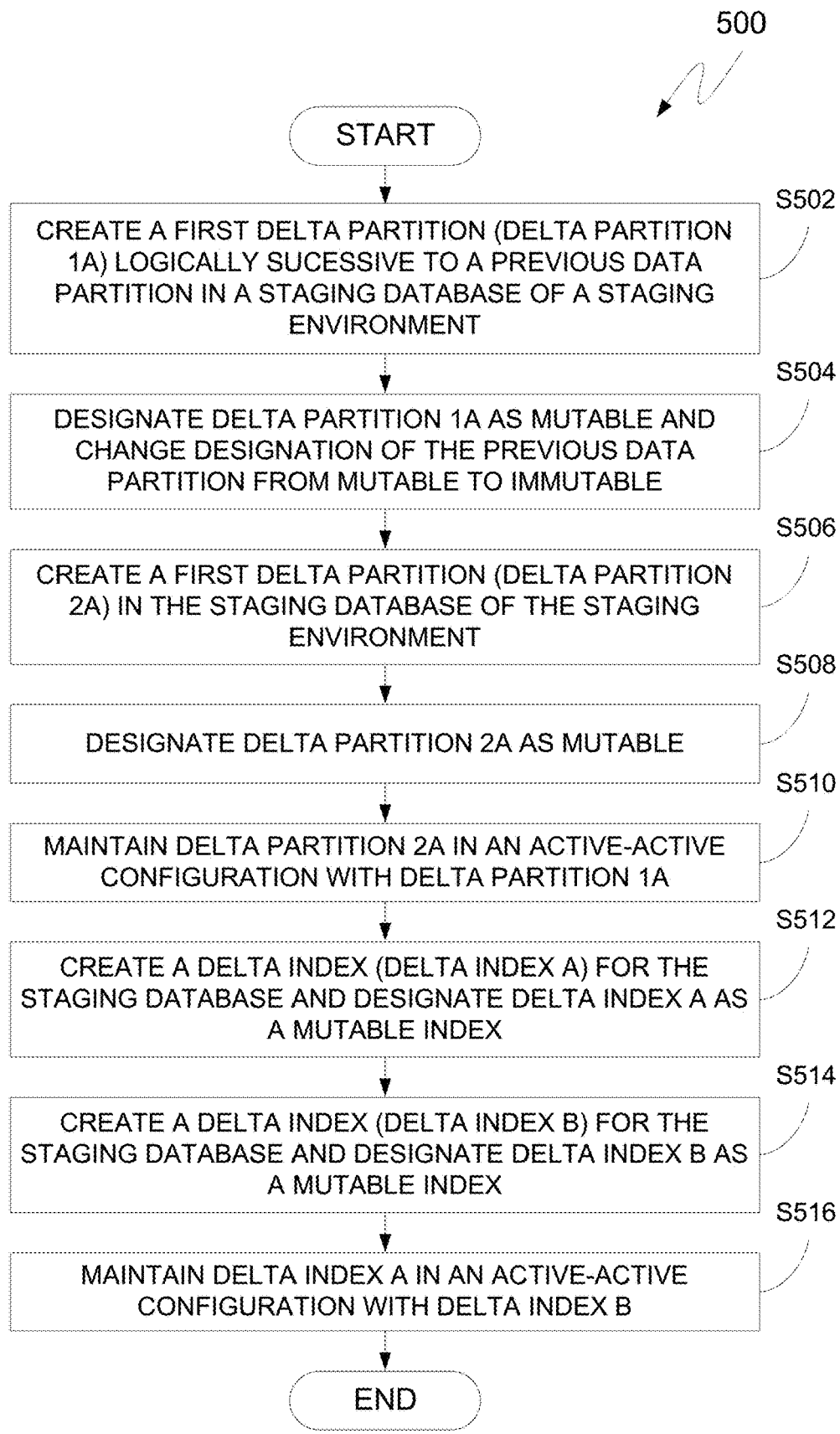
FIG. 5 is a flow chart diagram depicting operational steps, generally designated 500, by a delta propagation program 101 for configuring databases located in a staging environment to a production environment running a live application in accordance with at least one embodiment of the invention.

FIG. 5 is a flow chart diagram depicting operational steps, generally designated 500, by a delta propagation program 101 for configuring databases located in a staging environment for instant propagation of data from the staging environment to a production environment running a live application in accordance with at least one embodiment of the invention. FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

At step S502, delta propagation program 101 creates a first delta partition (hereinafter "Delta Partition 1A") in a staging database of a staging environment. For example, delta propagation program 101 creates Delta Partition 1A in staging database 130 of FIG. 1.

At step S504, delta propagation program 101 designates Delta Partition 1A as mutable and changes the designation of (i.e., converts) a previous data partition from a mutable partition to an immutable partition. In some embodiments, delta propagation program 101 creates a delta partition that is logically sequential to a base partition. In these embodiments, the base partition includes an original set of data and is designated as mutable. Here, delta propagation program 101 converts the base partition from a mutable partition to an immutable partition and designates the newly created delta partition (Delta Partition 1A) as mutable.

In other embodiments, delta propagation program 101 creates a new delta partition that is logically sequential to a previous delta partition. In these embodiments, delta propagation program 101 designates the newly created delta partition (Delta Partition 1A) as mutable and converts the previous delta partition from a mutable partition to an immutable partition. It should be appreciated that any number of new delta partitions can be created in logical succession to a previously created delta partition. It should further be appreciated that only the last created delta index should be designated as mutable. Thus, if there are ten sequential delta indexes, only the tenth delta index should be designated as mutable.

At step S506, delta propagation program 101 creates a first delta partition (hereinafter "Delta Partition 2A") in the staging database of the staging environment. For example, delta propagation program 101 creates Delta Partition 2A in staging database 130 of FIG. 1.

At step S508, delta propagation program 101 designates the newly created delta partition (Delta Partition 2A) as mutable. Accordingly, read (R) and write (W) operations can be performed on this data partition.

At step S510, delta propagation program 101 maintains Delta Partition 1A and Delta Partition 2A located in the staging database in an active-active configuration. Accordingly, as data is written to Delta Partition 1A in the staging database, delta propagation program 101 replicates the data on Delta Partition 2A in the staging database.

At step S512, delta propagation program 101 creates a first delta index (hereinafter "Delta Index A") for the staging database. For example, delta propagation program 101 creates Delta Index A in staging database 130 of FIG. 1. Delta propagation program 101 designates Delta Index A for the staging database as mutable. Delta Index A for the staging database includes: (i) the column values across the data partitions located on the staging database and (ii) a set of pointers that reference the unique network address of a data partition where a column value is located.

At step S514, delta propagation program 101 creates a second delta index (hereinafter "Delta Index B") for the staging database. For example, delta propagation program 101 creates Delta Index B in staging database 130 of FIG. 1. Delta propagation program 101 designates Delta Index B for the staging database as mutable. Delta Index B for the staging database includes: (i) the column values across the data partitions located on the staging database and (ii) a set of pointers that reference the unique network address of a data partition where a column value is located.

At step S516, delta propagation program 101 maintains Delta Index B in an active-active configuration with Delta Index A located in the staging database. Accordingly, as data is written to Delta Partition 1A of the staging database and replicated to Delta Partition 2A of the staging database, the changes are simultaneously updated in Delta Index A and Delta Index B.

Figure 6:
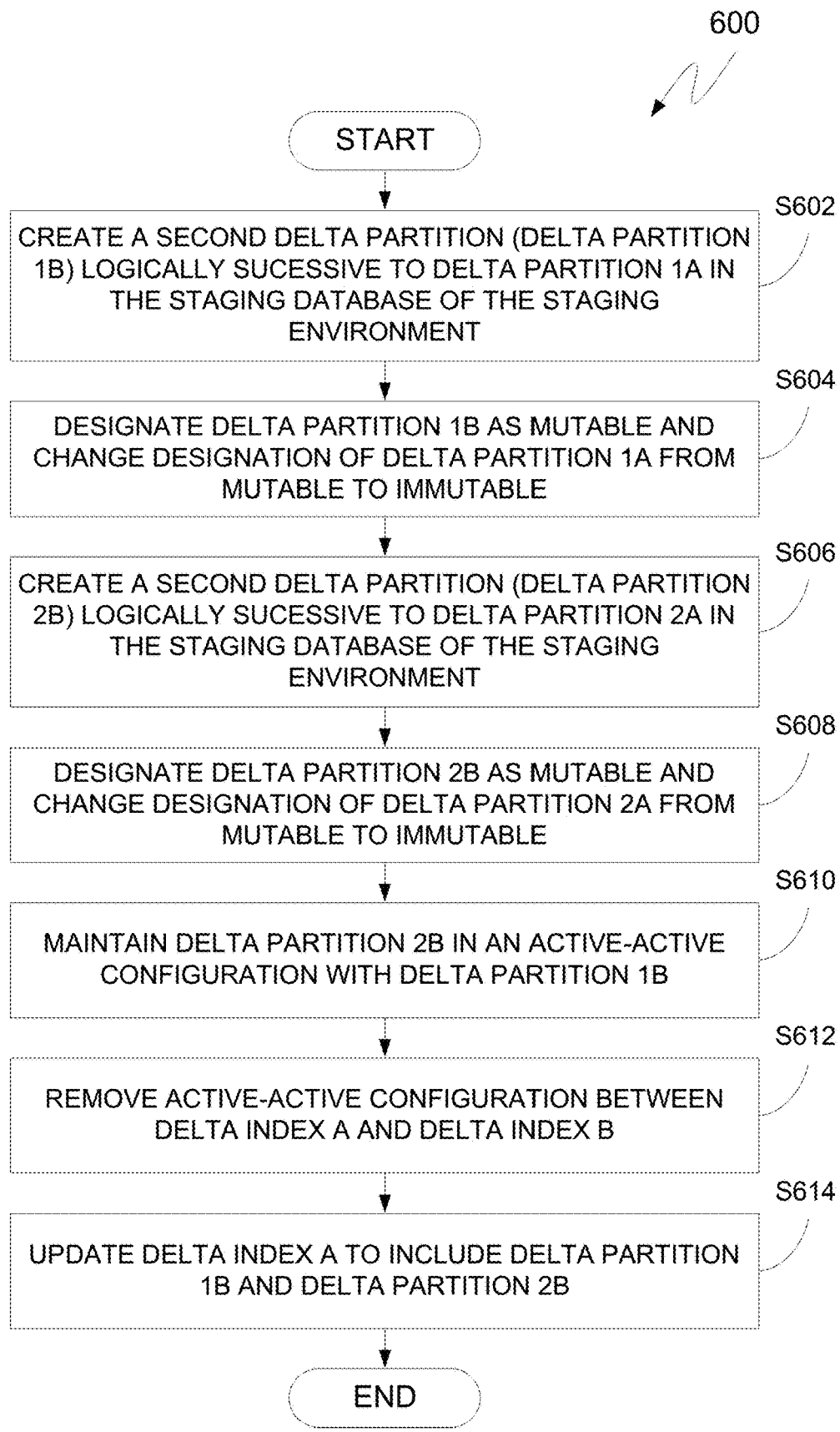
FIG. 6 is a flow chart diagram depicting operational steps, generally designated 600, by delta propagation program 101 for preparing the configured databases in accordance with FIG. 5 for instant propagation of data written to Delta Partition 2A of the staging database to the production environment in accordance with at least one embodiment of the invention.

FIG. 6 is a flow chart diagram depicting operational steps, generally designated 600, by delta propagation program 101 for preparing the configured databases in accordance with FIG. 5 for instant propagation of data written to Delta Partition 2A of the staging database to the production environment in accordance with at least one embodiment of the invention. FIG. 6 provides only an illustration of one implementation and does not imply any limitations with regard to the environments in which different embodiments may be implemented. Many modifications to the depicted environment may be made by those skilled in the art without departing from the scope of the invention as recited by the claims.

At step S602, delta propagation program 101 creates a second delta partition (hereinafter "Delta Partition 1B") logically successive to Delta Partition 1A of the staging database previously created in step S502 of FIG. 5. For example, delta propagation program 101 creates Delta Partition 1B which is logically successive to Delta Partition 1A located in staging database 130 of FIG. 1.

At step S604, delta propagation program 101 designates Delta Partition 1B as mutable and changes the designation of (i.e., converts) of a previous data partition (Delta Partition 1A) of the staging database from mutable to immutable.

At step S606, delta propagation program 101 creates a second delta partition (hereinafter "Delta Partition 2B) logically successive to Delta Partition 2A of the staging database previously created in step S506 of FIG. 5. For example, delta propagation program 101 creates Delta Partition 2B which is logically successive to Delta Partition 1B located in staging database 130 of FIG. 1.

At step S608, delta propagation program 101 designates Delta Partition 2B as mutable and changes the designation of (i.e., converts) Delta Partition 2A from a mutable data partition to an immutable data partition.

At step S610, delta propagation program 101 maintains Delta Partition 2B and Delta Partition 1B located in the staging database in an active-active configuration. Accordingly, as data is written to Delta Partition 1B in the staging database, delta propagation program 101 replicates the data on Delta Partition 2B in the staging database.

At step S612, delta propagation program 101 removes Delta Index B from being maintained in an active-active configuration with Delta Index A located in the staging database. Accordingly, Delta Index B is no longer kept in sync with Delta Index A. Thus, Delta Index B in the staging database does not include: (i) the column values across Delta Partition 1B in the staging database and Delta Partition 2B in the staging database and (ii) a set of pointers that reference the unique network addresses of Delta Partition 1B and Delta Partition 2B where a particular column value can be located.

At step S614, delta propagation program 101 updates Delta Index A located in the staging database. Delta propagation program 101 updates Delta Index A for the staging database to include: (i) the column values across Delta Partition 1B and Delta 2B in the staging database and Delta and (ii) a set of pointers that reference the unique network addresses of Delta Partition 1B and Delta Partition 2B where a particular column value can be located.

Figure 7:
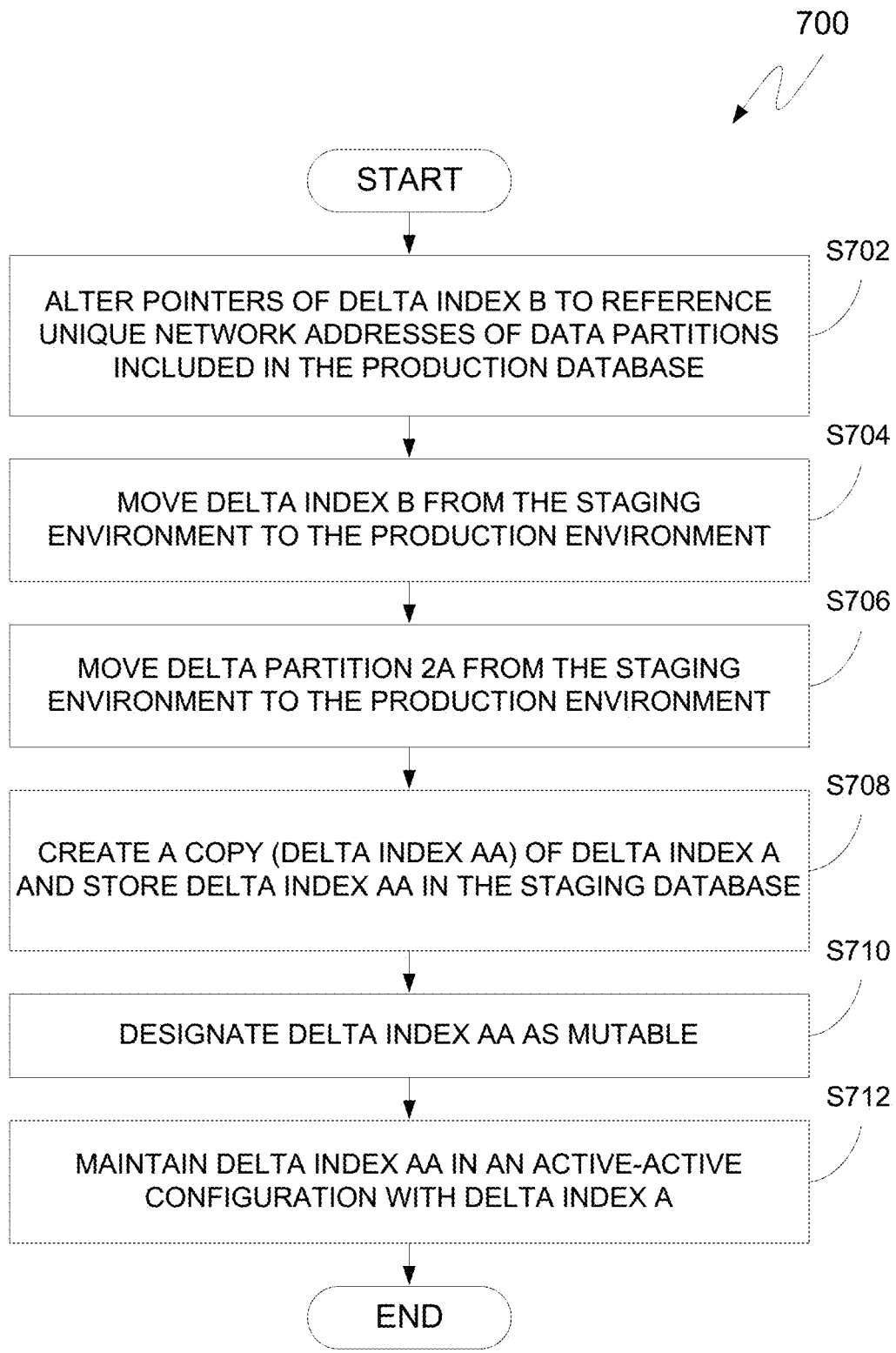
FIG. 7 is a flow chart diagram depicting operational steps, generally designated 700, by delta propagation program 101 for instantly propagating data written to Delta Partition 2A of the staging database to the production environment in accordance with at least one embodiment of the invention.

FIG. 7 is a flow chart diagram depicting operational steps, generally designated 700, by delta propagation program 101 for instantly propagating data written to Delta Partition 2A of the staging database to the production environment in accordance with at least one embodiment of the invention. FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

At step S702, delta propagation program 101 alters the set of pointers of Delta Index B located in the staging database. Here, delta propagation program 101 switches the set of pointers included in Delta Index B to now reference the unique network addresses of those data partitions included in the production database. It should be appreciated that Delta Index B already includes pointers that reference Delta Partition 2A which is logically being moved to the production environment.

It should further be appreciated that those data partitions located in the production database are copies of data partitions that were previously copied from the staging environment to the production environment. Accordingly, the data partitions included in the production database are exact copies of the data partitions included in the staging database. As such, the column values across a data partition located in the production database and the data written to a data partition located in the production database are the same across a copy of the data partition located in the staging database.

For example, if production database includes "Delta Partition 5" having column values D, E and F, then staging database also includes a copy of "Delta Partition 5" having column values D, E and F. The only difference between "Delta Partition 5" of the production database and the copy of "Delta Partition 5" located in the staging database is the unique network address of the data partitions. For example, "Delta Partition 5" of the production database having column values D, E and F has the unique network address "1234" and "Delta Partition 5" of the staging database having column values D, E and F has the unique network address "5678."

At step S704, delta propagation program 101 moves Delta Index B from the staging environment to the production environment. It should be appreciated that Delta Index B is not physically moved from the staging database of the staging environment to the production database of the production environment. Rather, Delta Index B is logically moved such that it appears to a production server of the production environment that Delta Index B of the staging database is located in the production environment. In other words, a production server of the production environment now accesses Delta Index B when processing database queries for an instance of a live web site running in the production environment.

In some embodiments of the invention, moving Delta Index B to the production environment includes replacing a delta index (hereinafter "Delta Index C") of the production environment with Delta Index B of the staging environment. In these embodiments, the production server continues to access Delta Index C for database queries issued prior to the replacement. However, once any database queries issued prior to the replacement have been processed, Delta Index B is removed from the production database of the production environment. Accordingly, delta propagation program 101 notifies the production server of the unique network address of Delta Index B and instructs the production server to access Delta Index B for database queries issued after the replacement of Delta Index C with Delta Index B.

In other embodiments, Delta Index C of the production environment is not removed and remains in the production database. In these embodiments, delta propagation program 101 removes the set of pointers referencing the unique network addresses of a data partition where a column value can be located and generates a single pointer in Delta Index C that references the unique network address of Delta Index B. Accordingly, when the production server accesses Delta Index C for database queries, the production server is redirected to Delta Index B located in the staging database.

At step S706, delta propagation program 101 moves Delta Partition 2A from the staging environment to the production environment. It should be appreciated that Delta Partition 2A is not physically moved from the staging database to the production database of the production environment. Rather, Delta Partition 2A is logically moved such that it appears to a production server of the production environment that Delta Partition 2A of the staging database is located in the production database of the production environment.

At step S708, delta propagation program 101 creates a copy (i.e., replica) (hereinafter "Delta Index AA") of Delta Index A located in the staging database and stores Delta Index AA in the staging database.

At step S710, delta propagation program 101 designates Delta Index AA as a mutable. Accordingly, read (R) and write (W) operations can be performed on Delta Index AA.

At step S712, delta propagation program 101 maintains Delta Index A and Delta Index AA located in the staging database in an active-active configuration. Accordingly, as data is written to Delta Partition 1B in the staging database and replicated to Delta Partition 2B in the staging database, the changes are simultaneously updated in Delta Index A and Delta Index AA of the staging environment.

Figure 8:
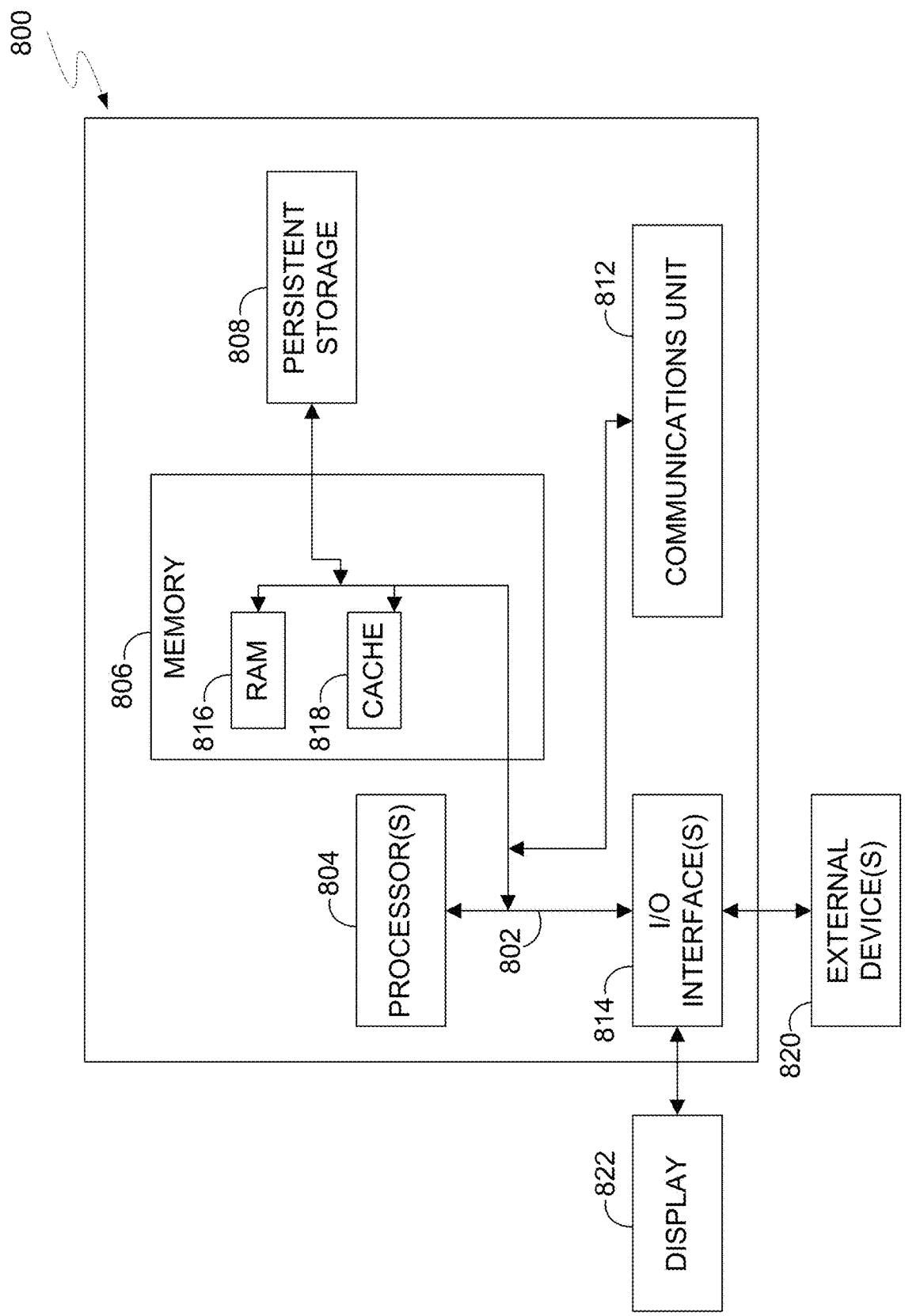
FIG. 8 is a block diagram depicting components of a computing device, generally designated 800, suitable for executing delta propagation program 101 in accordance with at least one embodiment of the invention.

FIG. 8 is a block diagram depicting components of a computing device, generally designated 800, suitable for executing delta propagation program 101 in accordance with at least one embodiment of the invention. Computing device 800 includes one or more processor(s) 804 (including one or more computer processors), communications fabric 802, memory 806 including, RAM 816 and cache 818, persistent storage 808, communications unit 812, I/O interface(s) 814, display 822, and external device(s) 820. It should be appreciated that FIG. 8 provides only an illustration of one embodiment and does not imply any limitations with regard to the environments in which different embodiments may be implemented. Many modifications to the depicted environment may be made.

As depicted, computing device 800 operates over communications fabric 802, which provides communications between computer processor(s) 804, memory 806, persistent storage 808, communications unit 812, and input/output (I/O) interface(s) 814. Communications fabric 802 can be implemented with any architecture suitable for passing data or control information between processor(s) 804 (e.g., microprocessors, communications processors, and network processors), memory 806, external device(s) 820, and any other hardware components within a system. For example, communications fabric 802 can be implemented with one or more buses.

Memory 806 and persistent storage 808 are computer readable storage media. In the depicted embodiment, memory 806 includes random-access memory (RAM) 816 and cache 818. In general, memory 806 can include any suitable volatile or non-volatile one or more computer readable storage media.

Program instructions for delta propagation program 101 can be stored in persistent storage 808, or more generally, any computer readable storage media, for execution by one or more of the respective computer processor(s) 804 via one or more memories of memory 806. Persistent storage 808 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 812, in these examples, provides for communications with other data processing systems or devices. In these examples, communications unit 812 can include one or more network interface cards. Communications unit 812 may provide communications through the use of either or both physical and wireless communications links. In the context of some embodiments of the present invention, the source of the various input data may be physically remote to computing device 800 such that the input data may be received, and the output similarly transmitted via communications unit 812.

I/O interface(s) 814 allows for input and output of data with other devices that may operate in conjunction with computing device 800. For example, I/O interface(s) 814 may provide a connection to external device(s) 820, which may be as a keyboard, keypad, a touch screen, or other suitable input devices. External device(s) 820 can also include portable computer readable storage media, for example thumb drives, portable optical or magnetic disks, and memory cards. Software and data used to practice embodiments of the present invention can be stored on such portable computer readable storage media and may be loaded onto persistent storage 808 via I/O interface(s) 814. I/O interface(s) 814 also can similarly connect to display 822. Display 822 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method for propagating changes to a live website, the computer-implemented method comprising:

logically moving, by one or more computer processors, a second immutable delta partition located in a staging database of a staging environment to a production environment, wherein the second immutable delta partition is a replica of a first immutable delta partition located in the staging database of the staging environment; and logically moving, by one or more computer processors, a second delta index located in the staging database to the production environment based, at least in part, on:

altering, by one or more computer processors, the second delta index to reference: (i) unique network addresses corresponding to data partitions located in a production database of the production environment and (ii) a unique network address of the second immutable delta partition located in the staging database of the staging environment.

2. The computer-implemented method of claim 1, wherein logically moving the second immutable delta partition located in the staging database of the staging environment to the production environment further includes:

converting, by one or more processors, the first immutable delta partition located in the staging database of the staging environment from a mutable delta partition to an immutable delta partition; and converting, by one or more processors, the second immutable delta partition located in the staging database of the staging environment from a mutable delta partition to an immutable delta partition.

3. The computer-implemented method of claim 1, wherein logically moving, by one or more computer processors, the second immutable delta partition located in the staging database of the staging environment to the production environment is further based, at least in part, on:
removing, by one or more computer processors, the second immutable delta partition located in the staging database of the staging environment from being maintained in an active-active configuration with the first immutable delta partition located in the staging database of the staging environment.

4. The computer-implemented method of claim 1, wherein logically moving, by one or more computer processors, the second delta index located in the staging database of the staging environment to the production environment is further based, at least in part, on:
converting, by one or more computer processors, the second delta index located in the staging database of the staging environment from a mutable delta index to an immutable delta index.

5. The computer-implemented method of claim 1, wherein logically moving, by one or more computer processors, the second delta index located in the staging database of the staging environment to the production environment is further based, at least in part, on:
removing, by one or more computer processors, the second delta index located in the staging database of the staging environment from being maintained in an active-active configuration with a first mutable delta index located in the staging database of the staging environment.

6. The computer-implemented method of claim 5, wherein logically moving, by one or more computer processors, the second delta index located in the staging database of the staging environment to the production environment is further based, at least in part, on:
generating, by one or more processors, a replica of the first mutable delta index located in the staging database of the staging environment; and
storing the replica of the first mutable delta index in the staging database of the staging environment.

7. The computer-implemented method of claim 6, further comprising:
maintaining, by one or more computer processors, the first mutable delta index in an active-active configuration with the replica of the first mutable delta index stored in the staging database of the staging environment.

8. The computer-implemented method of claim 1, wherein logically moving, by one or more computer processors, the second delta index located in the staging database of the staging environment to the production environment is further based, at least in part, on:
replacing, by one or more computer processors, a delta index located in the production database of the production environment with the second delta index located in the staging database of the staging environment.

9. The computer-implemented method of claim 8, wherein the delta index located in the production database of the production environment is replaced with the second delta index located in the staging database of the staging environment after processing database queries issued prior to moving the second delta index located in the staging database to the production environment is completed.

10. The computer-implemented method of claim 1, further comprising:
generating, by one or more processors, a pair of mutable delta partitions, wherein:
a first mutable delta partition in the pair of mutable delta partitions is logically successive to the first immutable delta partition located in the staging database of the staging environment; and
a second mutable delta partition in the pair of mutable delta partitions is logically successive to the second immutable delta partition located in the staging database of the staging environment.

11. The computer-implemented method of claim 8, wherein:
the first mutable delta partition logically successive to the first immutable delta partition located in the staging database of the staging environment is maintained in an active-active configuration with the second mutable delta partition logically successive to the second immutable delta partition located in the staging database of the staging environment.

12. The computer-implemented method of claim 1, wherein:
the production environment includes a first instance of a website that is online; and
the staging environment includes a second instance of the website that is offline.

13. The computer-implemented method of claim 12, wherein:
the first instance of the website that is online and the second instance of the website that is offline are asynchronously replicated between the staging environment and the production environment.

14. A computer program product for propagating changes to a live website, the computer program product comprising one or more computer readable storage media and program instructions stored on the one or more computer readable storage media, the program instructions including instructions to:
logically move a second immutable delta partition located in a staging database of a staging environment to a production environment, wherein the second immutable delta partition is a replica of a first immutable delta partition located in the staging database of the staging environment; and
logically move a second delta index located in the staging database to the production environment based, at least in part, on instructions to:
alter the second delta index for the staging database to reference: (i) unique network addresses corresponding to data partitions located in a production database of the production environment and (ii) a unique network address of the first immutable delta partition located in the staging database.

15. The computer program product of claim 14, wherein the instructions to logically move the second immutable delta partition located in the staging database of the staging environment to the production environment further includes instructions to:
convert the first immutable delta partition located in the staging database of the staging environment from a mutable delta partition to an immutable delta partition; and
convert the second immutable delta partition located in the staging database of the staging environment from a mutable delta partition to an immutable delta partition.

16. The computer program product of claim 14, wherein the instructions to logically move the second immutable delta partition located in the staging database of the staging environment to the production environment is further based, at least in part, on instructions to:
  remove the second immutable delta partition located in the staging database of the staging environment from being maintained in an active-active configuration with the first immutable delta partition located in the staging database of the staging environment.

17. The computer program product of claim 14, wherein the instructions to logically move the second delta index located in the staging database of the staging environment to the production environment is further based, at least in part, on instructions to:
  convert the second delta index located in the staging database of the staging environment from a mutable delta index to an immutable delta index.

18. The computer program product of claim 14, wherein the instructions to logically move the second delta index located in the staging database of the staging environment to the production environment is further based, at least in part, on instructions to:
  remove the second delta index located in the staging database of the staging environment from being maintained in an active-active configuration with a first mutable delta index located in the staging database of the staging environment.

19. The computer program product of claim 18, wherein the instructions to logically move the second delta index located in the staging database of the staging environment to the production environment is further based, at least in part, on instructions to:
  generate a replica of the first mutable delta index located in the staging database of the staging environment; and
  store the replica of the first mutable delta index in the staging database of the staging environment.

20. A computer system for propagating changes to a live website, the computer system comprising:
  one or more computer processors;
  one or more computer readable storage media;
  computer program instructions;
  the computer program instructions being stored on the one or more computer readable storage media for execution by the one or more computer processors; and
  the computer program instructions including instructions to:
  logically move a second immutable delta partition located in a staging database of a staging environment to a production environment, wherein the second immutable delta partition is a replica of a first immutable delta partition located in the staging database of the staging environment; and
  logically move a second delta index located in the staging database to the production environment based, at least in part, on instructions to:
    alter the second delta index for the staging database to reference: (i) unique network addresses corresponding to data partitions located in a production database of the production environment and (ii) a unique network address of the second immutable delta partition located in the staging database.

* * * * *